United States Patent
Kelly et al.

(10) Patent No.: US 12,408,234 B2
(45) Date of Patent: Sep. 2, 2025

(54) DEVICE, SYSTEM AND METHOD FOR DISPATCHING PUBLIC-SAFETY RESPONDER TYPES TO A THREE-DIMENSIONAL LOCATION

(71) Applicant: MOTOROLA SOLUTIONS, INC., Chicago, IL (US)

(72) Inventors: Richard Kelly, Chicago, IL (US); James Shepard, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 491 days.

(21) Appl. No.: 17/883,186

(22) Filed: Aug. 8, 2022

(65) Prior Publication Data
US 2024/0049352 A1 Feb. 8, 2024

(51) Int. Cl.
*H04W 4/90* (2018.01)
*H04W 4/029* (2018.01)
*H04W 76/50* (2018.01)

(52) U.S. Cl.
CPC ........... *H04W 76/50* (2018.02); *H04W 4/029* (2018.02); *H04W 4/90* (2018.02)

(58) Field of Classification Search
CPC .................................................. H04W 76/50
USPC ..................................................... 455/404.2
See application file for complete search history.

(56) References Cited

U.S. PATENT DOCUMENTS 9,532,387 B2 * 12/2016 Marshall ............... H04W 4/025
10,820,181 B2 * 10/2020 Horelik ................... H04W 4/14
2019/0253861 A1 * 8/2019 Horelik ............... H04W 64/006

OTHER PUBLICATIONS

NENA i3 Standard for Next Generation 9-1-1, Appendix A, pp. 485-496, published Oct. 7, 2021.
LoST: A Location-to-Service Translation Protocol, https://www.rfc-editor.org/rfc/rfc5222.html, Published Aug. 2008 Attached is the PDF.

* cited by examiner

*Primary Examiner* — Qutbuddin Ghulamali
(74) *Attorney, Agent, or Firm* — PERRY + CURRIER INC. (FOR MSI)

(57) ABSTRACT

A device, system and method for dispatching public-safety responder types to a three-dimensional location is provided. A device: receives a call and an associated location including ground coordinates and an altitude; and selects a primary public-safety responder type from a plurality of public-safety responder types associated with corresponding altitude ranges that are at or near the ground coordinates, the primary public-safety responder type associated with a corresponding altitude range that includes the altitude of the associated location of the call. The device one of automatically dispatches the primary public-safety responder type to the ground coordinates and the altitude associated with the call; and provides, to a public-safety answering point associated with the ground coordinates, an electronic suggestion to dispatch the primary public-safety responder type to the ground coordinates and the altitude associated with the call.

20 Claims, 7 Drawing Sheets

DEVICE, SYSTEM AND METHOD FOR DISPATCHING PUBLIC-SAFETY RESPONDER TYPES TO A THREE-DIMENSIONAL LOCATION

BACKGROUND OF THE INVENTION

In emergency services environments (e.g., that include public-safety answering points and/or 911 environments), dispatch of public-safety responders may be based on known or estimated ground coordinates, such as latitude and longitude coordinates, associated with a call that requests emergency services. However, such a dispatch may be challenging when an incident is at a location that has an altitude that it is above or below a reference ground level.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
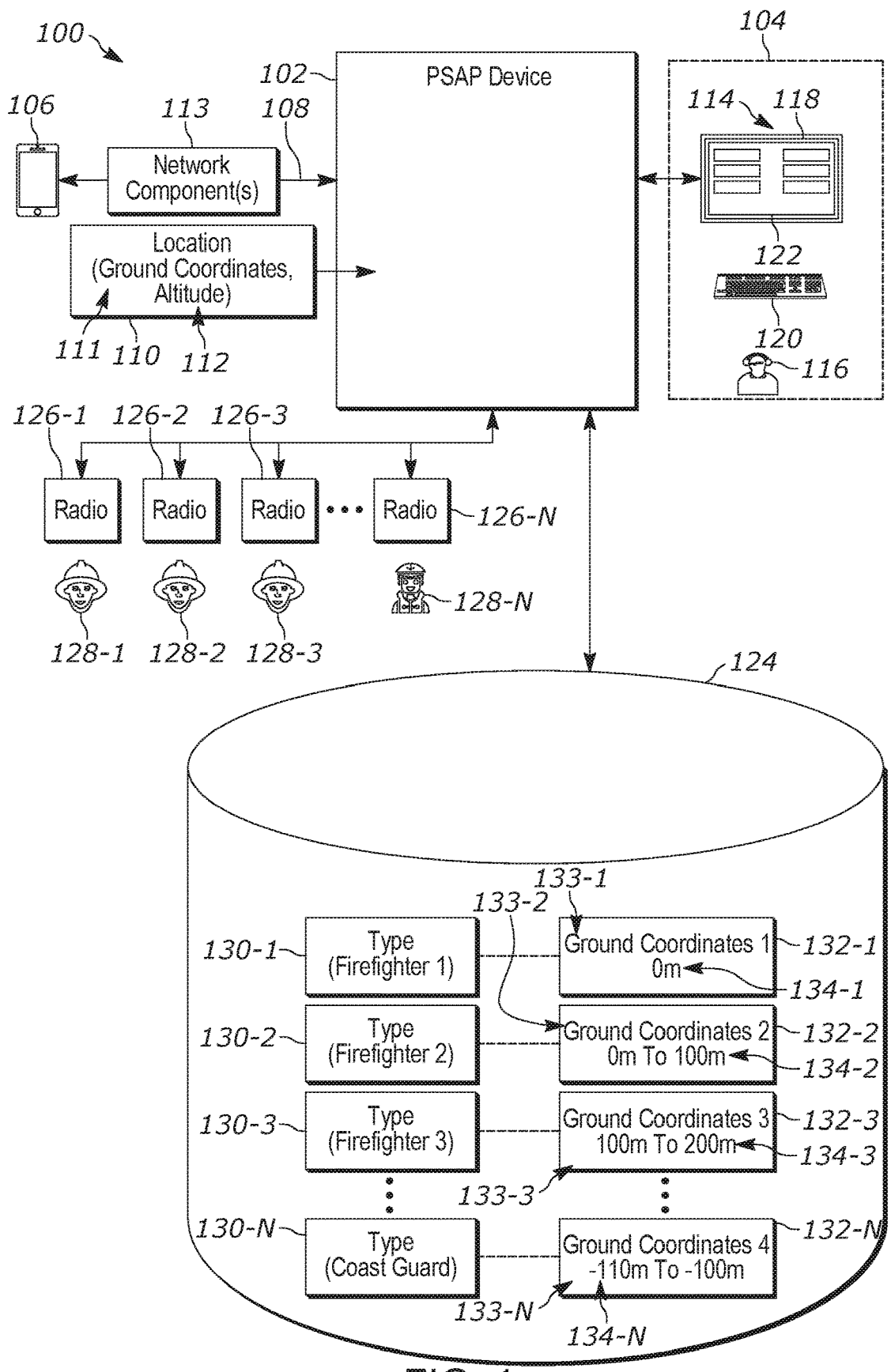
FIG. 1 is a system for dispatching public-safety responder types to a three-dimensional location, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In emergency services environments (e.g., that include public-safety answering points and/or 911 environments), dispatch of public-safety responders may be based on known or estimated ground coordinates, such as latitude and longitude coordinates, associated with a call that requests emergency services. However, such a dispatch may be challenging when an incident is at a location that has an altitude that it is above or below a reference ground level. For example, dispatch of a fire department (e.g., firefighters thereof) to ground coordinates associated with a call may be ineffective when an altitude associated with a call is above or below a reference ground level (e.g., on a high floor of a building, or at water level under a bridge) when the fire department does not have the resources and/or equipment to perform emergency services at the altitude. For example, fire fighters of the fire department may arrive at the ground coordinates only to find they cannot reach an altitude, at which emergency services are to be provided. Thus, there exists a need for an improved technical method, device, and system for dispatching public-safety responder types to a three-dimensional location.

Hence, provided herein is a device, system and method for dispatching public-safety responder types to a three-dimensional location. For example, a public-safety answering point (PSAP) device (e.g., which may include, but is not limited to a combination of one or more PSAP devices, servers, cloud computing devices, routers, proxy devices, and the like) is generally configured to receive a call (e.g., a 911 call) and an associated location that includes ground coordinates and an altitude. The ground coordinates may comprise known and/or estimated ground coordinates of a communication device that initiates the call; similarly the altitude may comprise a known and/or estimated altitude of the communication device. The ground coordinates may be provided in the form of a latitude, a longitude, and/or a civic address (e.g., a street address), and the altitude may be provided as a height that is above or below a reference ground level, such as sea level, or a given altitude that corresponds to street level of a city and/or any other jurisdiction. The ground coordinates and altitude may be alternatively provided as Global Positioning System (GPS) coordinates. The location may be determined by the communication device (e.g., using a GPS component of the communication device) and transmitted by the communication device as metadata of the call, and/or the location may be determined by network components configured to estimate a location of a communication devices (e.g., using triangulation techniques, and the like). Regardless of how the location is determined, the location is understood to comprise a three-dimensional location that includes two-dimensional ground coordinates and an altitude.

The PSAP device is understood to have access to a memory that stores a plurality of public-safety responder types associated with respective ground coordinates, and/or a range of ground coordinates, and corresponding altitude ranges (e.g., in the form of a database and the like). For example, a public-safety responder type stored at the memory may include a range of ground coordinates, and/or an area serviced by the public-safety responder type, and a corresponding altitude range, at which the public-safety responder type is equipped to provide emergency services.

In a particular example, a first public-safety responder type may indicate a first particular fire department that services a first given area indicated by a first range of ground coordinates, as well as a first corresponding altitude range of "0 meters", for example relative to reference ground level, which indicates that the first particular fire department has equipment that is capable of providing emergency services only at the reference ground level.

Similarly, a second public-safety responder type may indicate a second particular fire department that services a second given area indicated by a second range of ground coordinates, as well as a second corresponding altitude range of "0 meters to 100 meters", for example relative to the reference ground level, which indicates that the second particular fire department has equipment that is capable of providing emergency services between 0 meters and 100 meters.

Similarly, a third public-safety responder type may indicate a third particular fire department that services a third given area indicated by a third range of ground coordinates, as well as a third corresponding altitude range of "100 meters to 200 meters", for example relative to the reference ground level, which indicates that the third particular fire department has equipment that is capable of providing emergency services between 100 meters and 200 meters.

While such examples include corresponding altitude ranges that are above or equal to a reference ground level, in other examples other public-safety responder types may be associated with corresponding altitude ranges that are below the reference ground level, such as a coast guard and/or water-based responder that provides emergency services on water (e.g., presuming the water is below a reference ground level).

While public-safety responder types are described with respect to fire departments and a coast guard, it is understood that public-safety responder types may include any suitable public-safety responder types including, but not limited to, fire departments, police departments, emergency medical technician (EMT) departments, coast guard, water police, harbor patrols, an air force, and the like, amongst other possibilities, which may provide emergency services at corresponding altitude ranges, and at corresponding ground coordinate ranges and/or areas When the PSAP device receives the call and the associated location that includes the ground coordinates and the altitude, the PSAP device compares the ground coordinates with the respective ranges of ground coordinates associated with the plurality of public-safety responder types to determine at least a subset of the public-safety responder types that services an area that includes the ground coordinates associated with the call. The PSAP device further selects a primary public-safety responder type from the plurality of public-safety responder types and/or the subset of the plurality of public-safety responder types, that has a corresponding altitude range that includes the altitude of the associated location of the call.

Put another way, the PSAP device selects a primary public-safety responder type from a plurality of public-safety responder types associated with corresponding altitude ranges that are at or near the ground coordinates (e.g., of the call), the primary public-safety responder type associated with a corresponding altitude range that includes the altitude of the associated location of the call.

When there is more than one public-safety responder type with corresponding altitude ranges that are at or near the ground coordinates, and corresponding altitude ranges that includes the altitude of the associated location of the call, the PSAP devices may designate a first public-safety responder type as the primary public-safety responder type and another primary public-safety responder as a secondary public-safety responder type. For example, the primary public-safety responder type may correspond to a public-safety responder type that is closest to the ground coordinates of the location associated with the call, and the secondary public-safety responder type may correspond to a public-safety responder type that is next closest to the ground coordinates of the location associated with the call. Alternatively, other criteria may be used to select a primary public-safety responder type and a secondary public-safety responder type, which may include, but it not limited to, one or more of associated response times of the public-safety responder types, associated equipment of the public-safety responder types, an incident type associated with the call, and the like. For example, the call may report a medical emergency of a heart attack, and a next closest public-safety responder type may have access to newer and/or better equipment for responding to heart attacks than a closest public-safety responder type, and hence the next closest public-safety responder type may be selected as the primary public-safety responder type, while the closest public-safety responder type may be selected as the secondary public-safety responder type.

The PSAP device may automatically dispatch the selected primary public-safety responder type to the ground coordinates and the altitude associated with the call.

Alternatively, the PSAP device may provide to a PSAP associated with the ground coordinates, and/or a PSAP terminal thereof, an electronic suggestion to dispatch the primary public-safety responder type to the ground coordinates and the altitude associated with the call. For example the PSAP device may service a plurality of PSAPs that dispatch public-safety responders to different respective areas, and the PSAP device may provide the electronic suggestion to a PSAP that services an area that includes the ground coordinates, such that the PSAP may perform the dispatch, for example in conjunction with rendering a graphic user interface (GUI) at a display screen that includes an indication of: the associated location, including the altitude; the plurality of public-safety responder types; and the corresponding altitude ranges of the plurality of public-safety responder types that are at or near the ground coordinates, as described in more detail below.

When the primary public-safety responder type is unavailable for dispatch, the secondary public-safety responder type may be dispatched.

A first aspect of the present specification provides a device comprising: a communication interface; a controller configured to: receive, via the communication interface, a call and an associated location including ground coordinates and an altitude; select a primary public-safety responder type from a plurality of public-safety responder types associated with corresponding altitude ranges that are at or near the ground coordinates, the primary public-safety responder type associated with a corresponding altitude range that includes the altitude of the associated location of the call; and one of: automatically dispatch, via the communication interface, the primary public-safety responder type to the ground coordinates and the altitude associated with the call; and provide, via the communication interface, to a public-safety answering point associated with the ground coordinates, an electronic suggestion to dispatch the primary public-safety responder type to the ground coordinates and the altitude associated with the call.

A second aspect of the present specification provides a method comprising: receiving, at a device, a call and an associated location including ground coordinates and an altitude; selecting, via the device, a primary public-safety responder type from a plurality of public-safety responder types associated with corresponding altitude ranges that are at or near the ground coordinates, the primary public-safety responder type associated with a corresponding altitude range that includes the altitude of the associated location of the call; and one of: automatically dispatching, via the device, the primary public-safety responder type to the ground coordinates and the altitude associated with the call; and providing, via the device, to a public-safety answering point associated with the ground coordinates, an electronic suggestion to dispatch the primary public-safety responder type to the ground coordinates and the altitude associated with the call.

Each of the above-mentioned aspects will be discussed in more detail below, starting with example system and device architectures of the system, in which the embodiments may be practiced, followed by an illustration of processing blocks for achieving an improved technical method, device, and system for dispatching public-safety responder types to a three-dimensional location.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for dispatching public-safety responder types to a three-dimensional location. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a PSAP device 102, which may generally be configured as a call-handing and/or call-taking device, amongst other possibilities, for a PSAP 104. For example, as depicted, the PSAP device 102 may be configured to communicate with a communication device 106 to receive a call 108 (e.g., as represented by a communication link between the communication device 106 and the PSAP device 102) as a proxy for the PSAP 104. The call 108 be automatically handled by the PSAP device 102 and/or forwarded to the PSAP 104.

While only one PSAP 104 and one communication device 106 are depicted, the system 100 may comprise any suitable number of PSAPs and communication devices, and the PSAP device 102 may be configured to receive any suitable number of calls, and provide call-handing and/or call-taking functionality for any suitable number of PSAPs.

The PSAP device 102 may comprise any suitable combination of one or more servers, one or more cloud computing devices, one or more routers, one or more proxy devices, and the like. In particular examples, the PSAP device 102 may comprise one or more Emergency Services Routing Proxy (ESRP) devices and/or one or more Emergency Call Routing Function (ECRF) devices that rely on the Internet Engineering Task Force's (IETF) Request for Comments (RFC) 5222: LOST: A Location-to-Service Translation Protocol. LoST is a protocol, by which one system can query another system about a specific location in order to obtain call location responder information.

For example, as depicted, it is understood that the call 108 is received at the PSAP device 102 with an associated location 110 that includes ground coordinates 111 and an altitude 112. The associated location 110 may be received as metadata with the call 108. The associated location 110 may be received in any suitable format including, but not limited to: GPS coordinates; a longitude and a latitude (e.g., the ground coordinates 111) and an altitude (e.g., the altitude 112); a street address (e.g., the ground coordinates 111) and an altitude (e.g., the altitude 112); and the like. Regardless of format, the associated location 110 is understood to include a three-dimensional location associated with the call 108, and which may generally correspond to a three-dimensional location of the communication device 106 that originated the call 108.

The location 110 may be determined and/or estimated by the communication device 106 using an on-board GPS component (not depicted) and/or the location 110 may be determined and/or estimated by one or more network components 113 (e.g., that assist in conveying the call 108) using triangulation techniques and the like.

As depicted, the system 100 and, in particular, the PSAP 104 may further comprise a PSAP terminal 114, and the like, in communication with the PSAP device 102, operated, for example, by a call-taker and/or dispatcher 116 and/or a dispatcher, and the like. In some examples, the PSAP 104 may direct the call to the PSAP 104 and/or the PSAP terminal 114, for example on the basis of the ground coordinates 111.

For example, the PSAP device 102 may be configured to direct the call 108 to a suitable PSAP associated with an area that includes the ground coordinates 111, and the PSAP 104 may be associated with an area that includes the ground coordinates 111.

In a particular example, the PSAP device 102 may include a combination of an access or service provider router and ECRF device, with the router querying the ECRF device using the LoST protocol for call routing instructions. As the PSAP 104 may be associated with an area that includes the ground coordinates 111, the router of the PSAP device 102 may receive call routing instructions from the ECRF device the PSAP device 102 to route the call 108 to the PSAP 104, which may in turn route the call to the PSAP terminal 114, or another PSAP terminal. Indeed, while one PSAP terminal 114 is depicted, the PSAP 104 may include any suitable number of PSAP terminals.

As depicted, the PSAP terminal 114 comprises a display screen 118 and an input device 120 (e.g., as such a keyboard, as depicted, a pointing device and/or any other suitable input device). However, the display screen 118 and the input device 120 may be provided in any suitable format (e.g., different from a PSAP terminal), such as a laptop, a personal computer, and the like (e.g., when the dispatcher 116 is working from home and/or "off-premises" from the PSAP 104). In general, the display screen 118 and the input device 120 may be used to interact with the PSAP terminal 114, for example via an interface 122 provided at the display screen 118, and the like. The interface 122 is described in more detail below with respect to FIG. 6 and FIG. 7.

The system 100 further comprises a memory 124 and a plurality of radios 126-1, 126-2, 126-3 . . . 126-N respectively associated with public-safety responders 128-1, 128-2, 128-3 . . . 128-N. The radios 126-1, 126-2, 126-3 . . . 126-N are interchangeably referred to hereafter, collectively, as the radios 126 and, generically, as a radio 126. This convention will be used throughout the present application. For example, the public-safety responders 128-1, 128-2, 128-3 . . . 128-N are interchangeably referred to hereafter, collectively, as the public-safety responders 128 and, generically, as a public-safety responder 128.

The number "N" of radios 126 and public-safety responder 128 may be any suitable number, and may comprise any number of public-safety responders 128 that service areas, from which the PSAP device 102 is configured to receive calls.

As depicted, the radios 126-1, 126-2, 126-3 are associated with respective public-safety responders 128-1, 128-2, 128-3 of firefighters and/or fire departments (e.g., represented by respective icons of firefighters), and the radio 126-N is associated with a public-safety responder 128-N of a coast guard (e.g., represented by an icon of a captain of a coast guard vessel).

The radios 126 are generally understood to include any suitable communication device used to receive dispatch instructions from the PSAP device 102 and/or the PSAP 104. It is further understood that the radios 126 may be replaced by any suitable wired and/or wireless communication devices, of which the radios 126 are but one example.

The memory 124 may comprise any suitable memory, which may be external (e.g., as depicted) or internal to the PSAP device 102, and which, in some examples, may be provided in the form of database, which may be configured according to the LoST protocol.

The memory 124 generally stores respective public-safety responders types 130-1, 130-2, 130-3 . . . 130-N (e.g., public-safety responders types 130 and/or a public-safety responders type 130), indicative of the public-safety responders 128-1, 128-2, 128-3 . . . 128-N, stored in association with respective three-dimensional (or two-dimensional) ranges of locations 132-1, 132-2, 132-3 . . . 132-N (e.g., locations 132 and/or a location 132) that include corresponding ground coordinate ranges 133-1, 133-2, 133-3 . . . 133-N (e.g., corresponding ground coordinate ranges 133 and/or a corresponding ground coordinate range 133) and corresponding altitude ranges 134-1, 134-2, 134-3 . . . 134-N (e.g., corresponding altitude ranges 134 and/or a corresponding altitude range 134). Associations between information stored at the memory 124 are indicated by dashed lines therebetween.

For example, the first public-safety responders type 130-1 indicates that the first public-safety responder 128-1 is a firefighter and/or firefighter department (e.g., "Firefighter 1") associated with a ground coordinate range 133-1 (e.g., "Ground Coordinates 1") and a corresponding altitude range 134-1 of "0 m" (e.g., where "m" stands for "meters"). Hence, in this example, the location 132-1 comprises a two-dimensional range of locations. While values of the ground coordinate range 133-1 are not depicted, the ground coordinate range 133-1 may comprise any suitable indication of an area that is serviced by the first public-safety responder 128-1. Furthermore, the corresponding altitude range 134-1 of "0 m" indicates that the first public-safety responder 128-1 has equipment that is capable of providing emergency services only at a reference ground level. The reference ground level may comprise any suitable altitude, for example relative to sea level, and the like. While the corresponding altitude range 134-1 of "0 m" is provided as one coordinate, the altitude range 134-1 may comprise as many as two coordinates (e.g., "0 m to 0 m", "0 m to 1 m", amongst other possibilities) that indicate that the first public-safety responder 128-1 has equipment that is capable of providing emergency services only at a reference ground level. Furthermore, while the corresponding altitude range 134-1 of "0 m" is provided in meters relative to the reference ground level, the corresponding altitude range 134-1 may be provided in any suitable format, such as GPS coordinates, and the like.

Similarly, the second public-safety responders type 130-2 indicates that the second public-safety responder 128-2 is a firefighter and/or firefighter department (e.g., "Firefighter 2") associated with a ground coordinate range 133-2 (e.g., "Ground Coordinates 2") and a corresponding altitude range 134-2 of "0 m to 100 m" (e.g., a three-dimensional range of locations 132-2) indicating that the second public-safety responder 128-2 has equipment that is capable of providing emergency services between 0 meters and 100 meters.

Similarly, the third public-safety responders type 130-3 indicates that the third public-safety responder 128-3 is a firefighter and/or firefighter department (e.g., "Firefighter 3") associated with a ground coordinate range 133-3 (e.g., "Ground Coordinates 3") and a corresponding altitude range 134-3 of "0 m to 100 m" indicating that the third public-safety responder 128-3 has equipment that is capable of providing emergency services between 100 meters and 200 meters. For example, the third public-safety responder 128-3 may comprise a fire fighter department that specializes in fighting fires at high altitudes. Hence, it is understood that both the second public-safety responders type 130-2 and the third public-safety responders type 130-3 may service an altitude of 100 m.

Similarly, the $N^{th}$ public-safety responders type 130-N indicates that the $N^{th}$ public-safety responder 128-N is a coast guard (e.g., "Coast Guard") associated with a corresponding ground coordinate range 133-N (e.g., "Ground Coordinates N") and a corresponding altitude range 134-N of "−110 m to −100 m" indicating that the $N^{th}$ public-safety responder 128-N has equipment that is capable of providing emergency services between −110 meters to −100 meters. For example, the Nth public-safety responder 128-N may comprise a coast guard vessel that specializes in water rescues between −110 meters to −100 meters, presuming that the coast guard vessel is located on a body of water that has a surface that is about between −110 meters and −100 meters below the reference ground level.

While firefighters and coast guards are used as examples of public-safety responders type 130, the public-safety responder types 130 may indicate any suitable public-safety responders 128. Similarly, while example altitude ranges of between −110 meters and 200 meters are provided, for example at water level and/or in a high rise building, any suitable altitude range is within the scope of the present specification and may include, but is not limited to: altitude ranges that correspond to mines and/or mine shafts and/or caves and/or underground locations (e.g., presuming an associated public-safety responder type 130 is equipped to provide underground emergency services); altitude ranges that correspond to altitudes, at which airplanes and/or helicopters and the like fly (e.g., presuming an associated public-safety responder type 130 is equipped to provide in-air emergency services); and the like, among other possibilities.

The information stored in the memory 124 may be provided in any suitable format. For example, the locations 132 may be provided in the form of, and/or as components of, Uniform Resource Identifiers (URIs) that include contact and/or routing information of an associated public-safety responder type 130, such as an associated network address and/or telephone number, and the like, of a respective radio 126 and/or communication device of an associated public-safety responder type 130.

Alternatively, and/or in addition, the locations 132 may be provided in the form of Geographic Information System (GIS) layers, such as GIS polygons and the like, which define the corresponding ground coordinate ranges 133 and corresponding altitude ranges 133.

Alternatively, and/or in addition, the public-safety responder types 130 may be stored with any other suitable information, including, but not limited to vertical response rescue types that may include, but is not limited to: indications of types of available rescue equipment used to implement responses to incidents at various altitudes, such as ladders, cherry-pickers, drones, planes, and the like; indications of other equipment, to which a corresponding public-safety responder 128 has access, including, but not limited to, types of medical equipment (e.g., for responding to different medical incidents) that may be used to perform medical procedures at various altitudes; and the like, amongst other possibilities. Such other suitable information and/or vertical response rescue types may be stored at the public-safety responder types 130 and/or separately from the public-safety responder types 130 and/or as a component of a URI, and the like.

In general, the PSAP device 102 is configured to receive the call 108 and the associated location 110, and select a primary public-safety responder type 130 from the plurality of public-safety responder types 130 associated with corresponding altitude ranges 134 that are at or near the ground coordinates 111 of the location 110 associated with the call 108. The primary public-safety responder type 130 that is selected by the PSAP device 102 is understood to be associated with a corresponding altitude range 134 that includes the altitude 112 of the associated location 110 of the call 108.

The PSAP device 102, having selected a primary public-safety responder type 130, may automatically dispatch the primary public-safety responder type 130 (e.g., a corresponding primary public-safety responder 128) to the ground coordinates 111 and the altitude 112 associated with the call 108, as described in more detail below.

Alternatively, the PSAP device 102, having selected a primary public-safety responder type 130 may provide to the PSAP 104 associated with the ground coordinates 111, an electronic suggestion to dispatch the primary public-safety responder type 130 (e.g., a corresponding primary public-safety responder 128) to the ground coordinates 111 and the altitude 112 associated with the call 108, as described in more detail below.

Figure 2:
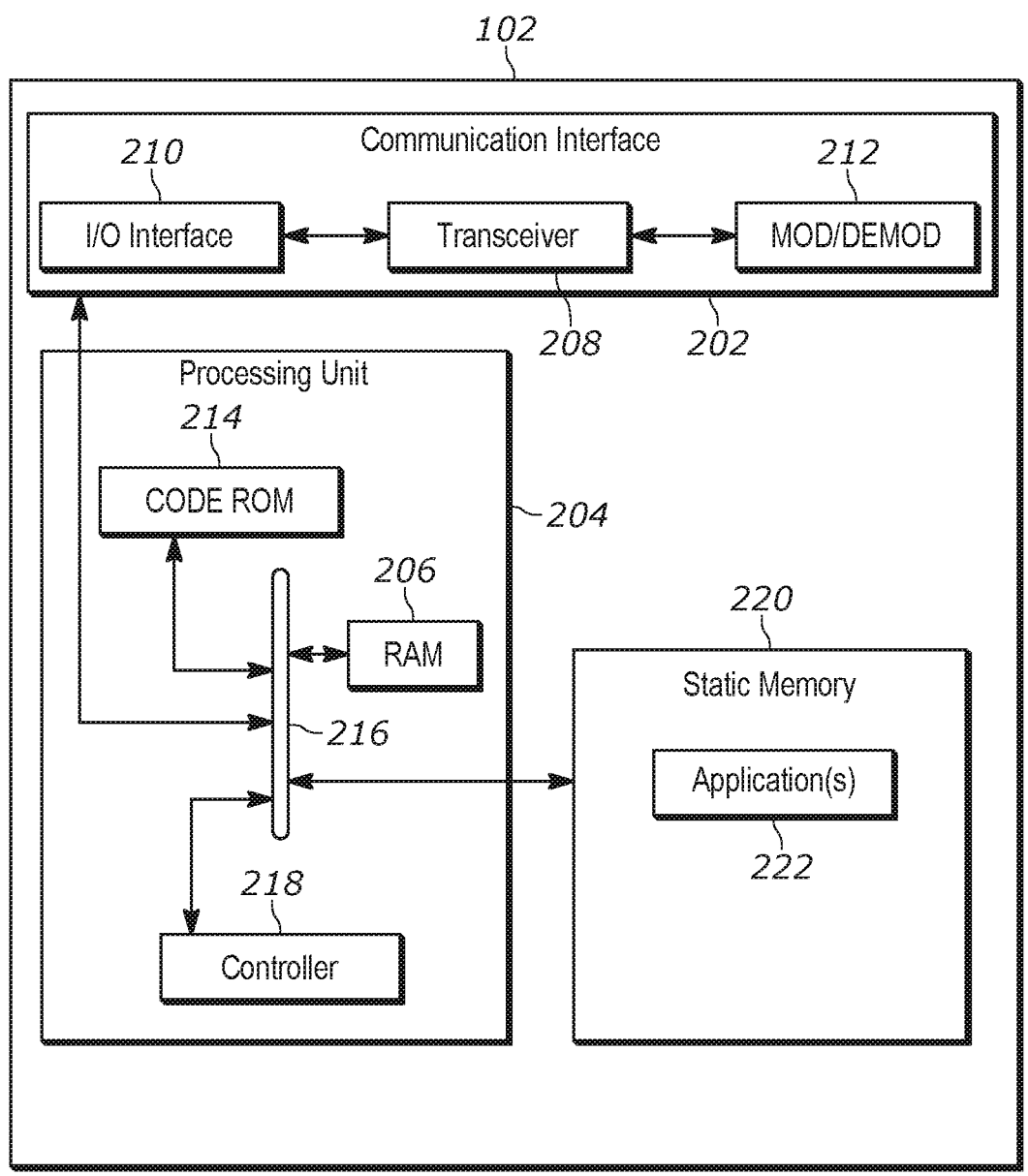
FIG. 2 is a device diagram showing a device structure of computing device for dispatching public-safety responder types to a three-dimensional location, in accordance with some examples.

Attention is next directed to FIG. 2, which depicts a schematic block diagram of an example of the PSAP device 102. While the PSAP device 102 is depicted in FIG. 2 as a single component, functionality of the PSAP device 102 may be distributed among a plurality of components and the like including, but not limited to, any suitable combination of one or more servers, one or more cloud computing devices, one or more routers, one or more proxy devices, and the like. In some examples, a portion of the functionality of the PSAP device 102 may be integrated with the PSAP terminal 114.

As depicted, the PSAP device 102 comprises: a communication interface 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the PSAP device 102 may have any suitable structure and/or configuration.

Furthermore, in some examples the memory 220 may at least partially comprise the memory 124, and/or the public-safety responder types 130 and the associated locations 132 (and/or URIs and/or GIS layers) may be stored at the memory 220.

While not depicted, the PSAP device 102 may include, and/or be in communication with, one or more of an input device and a display screen (and/or any other suitable notification device) and the like, such as the input device 120 and/or the display screen 118 of the PSAP terminal 114, and the like.

As shown in FIG. 2, the PSAP device 102 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the PSAP device 102 is not a generic controller and/or a generic device, but a device specifically configured to implement functionality for dispatching public-safety responder types to a three-dimensional location. For example, in some examples, the PSAP device 102 and/or the controller 218 specifically comprises a computer executable engine configured to implement functionality for dispatching public-safety responder types to a three-dimensional location.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the PSAP device 102 as described herein are maintained, persistently, at the memory 220 and used by the controller 218, which makes appropriate utilization of volatile storage during the execution of such programming instructions.

Figure 3:
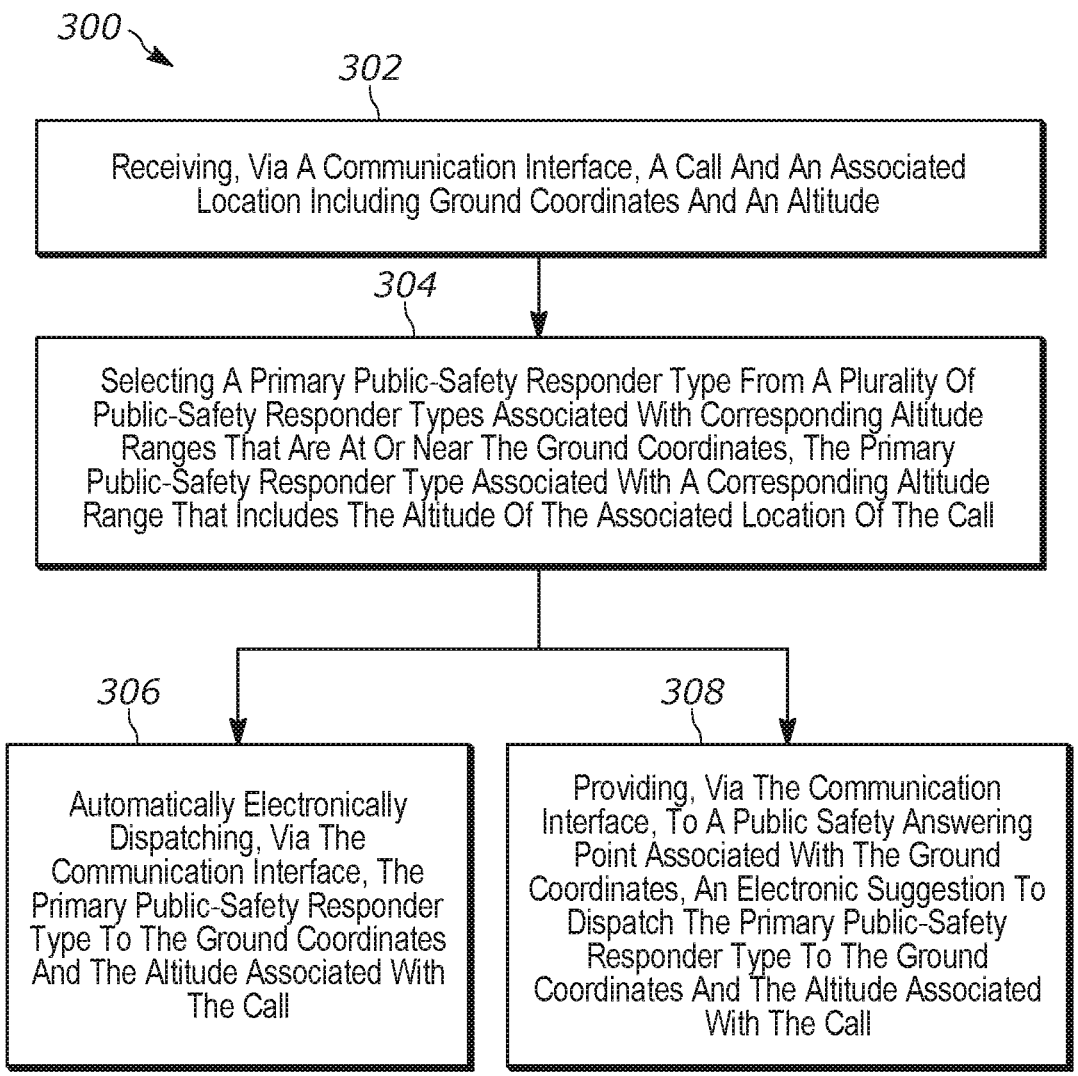
FIG. 3 is a flowchart of a method for dispatching public-safety responder types to a three-dimensional location, in accordance with some examples.

In particular, the memory 220 stores instructions corresponding to the at least one application 222 that, when executed by the controller 218, enables the controller 218 to implement functionality for dispatching public-safety responder types to a three-dimensional location, including but not limited to, the blocks of the method set forth in FIG. 3.

The application 222 may include programmatic algorithms, and the like, to implement functionality as described herein. Alternatively, and/or in addition to numerical algorithms, the application 222 may include machine learning models and/or algorithms, and the like, which have been trained to implement functionality for dispatching public-safety responder types to a three-dimensional location. Furthermore, the application 222 may be operated in a training mode to train machine learning models and/or algorithms thereof to implement functionality for dispatching public-safety responder types to a three-dimensional location.

The one or more machine learning models and/or algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, such as PSAP environments, and the like. Any suitable machine learning algorithm and/or deep learning algorithm and/or neural network is within the scope of present examples.

While details of the PSAP terminal 114 and the radios 126 are not depicted, the PSAP terminal 114 and the radios 126 may have components similar to the PSAP device 102 adapted, however, for the functionality thereof.

Attention is now directed to FIG. 3, which depicts a flowchart representative of a method 300 for dispatching public-safety responder types to a three-dimensional location. The operations of the method 300 of FIG. 3 correspond to machine readable instructions that are executed by the PSAP device 102, and specifically the controller 218 of the PSAP device 102. In the illustrated example, the instructions represented by the blocks of FIG. 3 are stored at the memory 220 for example, as the application 222. The method 300 of FIG. 3 is one way that the controller 218 and/or the PSAP device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the PSAP device 102, receives (e.g., via the communication interface 202), the call 108 and the associated location 110 including the ground coordinates 111 and the altitude 112.

Receipt of the call 108 and the associated location 110 has been described with respect to FIG. 1.

It is further understood that the PSAP device 102 may automatically answer the call 108 and conduct an initial conversation with a user of the communication device 106 using automated call-taker functionality (e.g., based on preconfigured scripts, text-to-speech functionality and speech-to-text functionality) to determine a type of incident that is being reported on the call 108 (e.g., any suitable combination of one or more of a fire incident, a medical incident, a police incident, and the like, amongst other possibilities). The PSAP device 102 may further open and/or store an incident report associated with the call 108.

At a block 304, the controller 218, and/or the PSAP device 102, selects a primary public-safety responder type 130 from the plurality of public-safety responder types 130 associated with corresponding altitude ranges 134 that are at or near the ground coordinates 111, the primary public-safety responder type 130 associated with a corresponding altitude range 134 that includes the altitude 112 of the associated location 110 of the call 108.

At a block 306, the controller 218, and/or the PSAP device 102, automatically dispatches (e.g., via the communication interface 202) the primary public-safety responder type 130 (e.g., a primary public-safety responder 128 indicated by the primary public-safety responder type 130) to the ground coordinates 111 and the altitude 112 associated with the call 108.

Alternatively, the controller 218, and/or the PSAP device 102, provides (e.g., via the communication interface 202), to the public-safety answering point 104 associated with the ground coordinates 111, an electronic suggestion to dispatch the primary public-safety responder type 130 (e.g., a primary public-safety responder 128 indicated by the primary public-safety responder type 130) to the ground coordinates 111 and the altitude 112 associated with the call 108.

In general, the controller 218, and/or the PSAP device 102 may implement block 306 or block 308, however in some examples the PSAP device 102 may implement both the block 306 and the block 308.

The method 300 is next described in more detail.

In some examples, as has already been described, the corresponding altitude ranges 134 (e.g., referred to at the block 304) include GIS layers associated with the plurality of public-safety responder types 130, and, as will be described in more detail below, such GIS layers may be rendered at the display screen 118, for example as components of the interface 122 (e.g., see FIG. 6 and FIG. 7).

In some examples, as has already been described, the plurality of public-safety responder types 130 (e.g., referred to at the block 304) are further associated with one or more of: respective contact information that enables respective dispatching of the plurality of public-safety responder types 130 (e.g., a corresponding public-safety responder 128); respective vertical response rescue types (e.g., indications of available rescue equipment and/or medical equipment); and the like, amongst other possibilities.

In some examples, as has already been described, at the block 304, the controller 218 and/or the PSAP device 102 is further configured to access the memory 124 to retrieve at least the corresponding altitude ranges 134 that are at or near the ground coordinates 111 associated with the call 108.

Furthermore, with respect to the block 304, it is understood that corresponding altitude ranges 134 that are "at or near" the ground coordinates 111, include a corresponding altitude range 134 of a location 132 (e.g., as stored at the memory 124) that are associated with a corresponding ground coordinate range 133 that includes the ground coordinates 111. Put another way, a corresponding altitude range 134 of a location 132 is understood to include an altitude range that is at the ground coordinates 111 associated with the call 108 and/or near (e.g., above) the ground coordinates 111 associated with the call 108 (e.g., within the corresponding ground coordinate range 133).

In some examples, the controller 218 and/or the PSAP device 102 may be further configured to, at the block 304, automatically select the primary public-safety responder type 130 from the plurality of public-safety responder types 130, such that the dispatching of the block 306 may occur automatically.

For example, the controller 218 and/or the PSAP device 102 may automatically select the primary public-safety responder type 130 from the plurality of public-safety responder types 130 by: selecting a public-safety responder type 130 with a corresponding ground coordinate range 133 that includes the ground coordinates 111 associated with the call 108 and a corresponding altitude range 134 that includes the altitude 112 associated with the call 108.

When more than one public-safety responder type 130 meets such criteria, the controller 218 and/or the PSAP device 102 may select one of the public-safety responder type 130 as the primary public-safety responder type 130 based on any suitable criteria.

For example, when more than one public-safety responder type 130 meets such criteria, the controller 218 and/or the PSAP device 102 may select one of the public-safety responder types 130 as the primary public-safety responder type 130, based on which of the more than one public-safety responder types 130 that meets the criteria is associated with a location (e.g., a location from which a corresponding public-safety responder 128 is dispatched) that is geographically closest to the ground coordinates 111 associated with the call 108. For example, the public-safety responder types 130 may be stored with a location and/or a street address, and the like, from which corresponding first responders 128 are dispatched. Hence, the public-safety responder type 130 that meets the criteria, and which is also closest to the ground coordinates 111 associated with the call 108 (e.g., based on the location and/or a street address, and the like, from which a corresponding first responder 128 are dispatched) may be selected as the primary public-safety responder type 130.

Alternatively, when more than one public-safety responder type 130 meets such criteria, the controller 218 and/or the PSAP device 102 may select one of the public-safety responder type 130 as the primary public-safety responder type 130 based on a type of incident associated with the call 108 and/or equipment available to the corresponding primary public-safety responders 128. For example, an incident associated with the call 108 (e.g., as determined by the PSAP device 102) may comprise a medical emergency of a heart attack, and one public-safety responder type 130 that meets the criteria may be associated with medical equipment for responding to a heart attack, while another public-safety responder type 130 that meets the criteria may not be associated with medical equipment for responding to a heart attack. Hence, the public-safety responder type 130 that meets the criteria, and which is also associated with medical equipment for responding to a heart attack may be selected as the primary public-safety responder type 130.

Furthermore, such a selection may be implemented programmatically and/or using one or more machine learning algorithms.

In some examples, for example at the block 306, the controller 218 and/or the PSAP device 102 may be further configured to: access a Uniform Resource Identifier (URI) associated with the primary public-safety responder type 130 (e.g., selected at the block 304); and dispatch (e.g., at the block 306) the primary public-safety responder type 130 at least partially based on the URI. As has been previously described, a URI as described herein may include contact information of a corresponding first responder 128 and/or an associated radio 126, and the like.

Dispatching of the primary public-safety responder type 130 (e.g., a corresponding primary public-safety responder 128) at the block 306 may comprise the controller 218 and/or the PSAP device 102 transmitting a command (e.g., a dispatch command) to a radio 126 of a corresponding primary public-safety responder 128. Such a dispatch command may comprise the location 110 including the ground coordinates 111 and the altitude 112, and any other suitable information, such as a type of an incident at the location 110, and the like.

Alternatively, at the block 304 and/or the block 306, the controller 218 and/or the PSAP device 102 may be further configured to control rendering of the interface 122 at the display screen 118 of the PSAP terminal 114. In particular, in some examples, at the block 304 and/or the block 306, the controller 218 and/or the PSAP device 102 may be further configured to: render, at the display screen 118 (e.g., at the interface 122), an indication of: the associated location 110, including the altitude 112; at least a subset of the plurality of public-safety responder types 130 (e.g., at least the public-safety responder types 130 with a corresponding ground coordinate range 133 that includes the ground coordinates 111 associated with the call 108 and a corresponding altitude range 134 that includes the altitude 112 associated with the call 108); and the corresponding altitude ranges 134 of at the subset of the plurality of public-safety responder types 130 that are at or near the ground coordinates 111 associated with the call 108. In these examples, the controller 218 and/or the PSAP device 102 may be further configured to: receive, via the input device 120, based on the indication as rendered, a selection of the primary public-safety responder type 130 from the subset of the plurality of public-safety responder types 130.

In some examples, the indication rendered at the display screen 118 may include one or more of: GIS layers associated with the corresponding altitude ranges 134 of the subset of the plurality of public-safety responder types 130, and a graphical indication of the associated location relative to the GIS layers; textual indications of the associated location 110 and the corresponding altitude ranges 134; and a floor of a building at the ground coordinates 111, the floor associated with the altitude 112. An example of the interface 122 is described with respect to FIG. 6 and FIG. 7. Furthermore, a floor of a building associated with the altitude 112, at the ground coordinates 111, may be determined from a database of buildings (not depicted) accessible to the PSAP device 102.

In these examples, selection of the primary public-safety responder type 30 at the block 304 may occur via the interface 122, and similarly, providing the electronic suggestion at the block 308 may occur via the interface 122.

For example, three-dimensional GIS layers that represent the locations 132 of least a subset of the plurality of public-safety responder types 130 (e.g., at least the public-safety responder types 130 with a corresponding ground coordinate range 133 that includes the ground coordinates 111 associated with the call 108 and a corresponding altitude range 134 that includes the altitude 112 associated with the call 108) may be provided at the display screen 118 at a map of an area that includes the ground coordinates 111 associated with the call 108, for example in the form of GUI. A graphical indication of the associated location 110 of the call 108 may also be provided relative to the GIS layers. An indication of the primary public-safety responder type 130 selected by the PSAP device 102 may also be rendered, for example as received in the electronic suggestion of the block 308. The dispatcher 116 may interact with the three-dimensional GIS layers via the input device 120 to cause the primary public-safety responder type 130 (e.g., a corresponding primary public-safety responder 128) to be dispatched; for example, the dispatcher 116 may operate the PSAP terminal 114 to cause a command (e.g., the aforementioned dispatch command) to dispatch the primary public-safety responder type 130 to be provided to the PSAP device 102, which may provide the dispatch command to a respective radio 126 of the corresponding primary public-safety responder 128.

Alternatively, and/or in addition, textual indications of the associated location 110 and the corresponding altitude ranges of least a subset of the plurality of public-safety responder types 130 (e.g., at least the public-safety responder types 130 with a corresponding ground coordinate range 133 that includes the ground coordinates 111 associated with the call 108 and a corresponding altitude range 134 that includes the altitude 112 associated with the call 108) may be provided at the display screen 118, for example in the form of a textual list, and the like. The dispatcher 116 may interact with the textual list, and the like, via the input device 120 to cause the primary public-safety responder type 130 (e.g., a corresponding primary public-safety responder 128) to be dispatched; for example, the dispatcher 116 may operate the PSAP terminal 114 to cause a command (e.g., the aforementioned dispatch command) to dispatch the primary public-safety responder type 130 to be provided to the PSAP device 102, which may provide the dispatch command to a respective radio 126 of the corresponding primary public-safety responder 128.

In combination with the GIS layers and/or the textual list, a floor of a building at the ground coordinates 111, the floor associated with the altitude 112, may be provided at the display screen 118, for example in the form of GUI and/or a textual indication, and the like.

In yet further examples, as has been previously described, more than one public-safety responder type 130 may be associated with a corresponding ground coordinate range 133 that includes the ground coordinates 111 associated with the call 108 and a corresponding altitude range 134 that includes the altitude 112 associated with the call 108, and the primary public-safety responder type 130 may be selected on the basis of any suitable criteria.

In these examples, the controller 218 and/or the PSAP device 102 may be further configured to: select a secondary public-safety responder type 130 from the plurality of public-safety responder types 130, the secondary public-safety responder type 130 associated with a respective corresponding altitude range 134 that includes the altitude 112 of the associated location 110 of the call 108; and when the primary public-safety responder type 130 (e.g., a corresponding primary public-safety responder 128) is unavailable for dispatch, one of: automatically dispatch (e.g., via the communication interface 202) the secondary public-safety responder type 130 (e.g., a corresponding secondary public-safety responder 128) to the ground coordinates 111 and the altitude 112 associated with the call 108; and provide (e.g., via the communication interface 202), to the PSAP 102 associated with the ground coordinates 111, a respective electronic suggestion to dispatch the secondary public-safety responder type 130 (e.g., a corresponding secondary public-safety responder 128) to the ground coordinates 111 and the altitude 112 associated with the call 108.

Put another way, the primary public-safety responder type 130 (e.g., a corresponding primary public-safety responder 128) may be occupied with another incident and may not be available to respond to an incident associated with the call 108. Such unavailability may be indicated in a reply to a dispatch command received via an associated radio 126. Alternatively, and/or in addition, such unavailability may be recorded by the PSAP device 102 in response to a previous dispatch of the primary public-safety responder type 130; for example, the PSAP device 102 may be further configured to track and/or record respective status of public-safety responder types 130 and/or corresponding public-safety responders 128. Such tracking may occur according to a Policy Routing Function (PRF) of the National Emergency Number Association (NENA) Standard.

Selection of the secondary public-safety responder type 130 may occur via any suitable criteria. For example, the primary public-safety responder type 130 may correspond to a public-safety responder 128 that is closest to the ground coordinates 111 of the associated location 110 of the call 108, and the secondary public-safety responder type 130 may correspond to a public-safety responder 128 that is next closest to the ground coordinates 111 of the associated location 110 of the call 108.

Alternatively, the primary public-safety responder type 130 may correspond to a public-safety responder 128 that may have a fastest response time in arriving at the altitude 112 (and/or the ground coordinates 111) of the associated location 110 of the call 108, and the secondary public-safety responder type 130 may correspond to a public-safety responder 128 that has a next fastest response time in arriving at the altitude 112 (and/or the ground coordinates 111) of the associated location 110 of the call 108. Such response times may be determined by the PSAP device 102, for example on the basis of indications of respective vertical response rescue types, and in particular respective types of available rescue equipment, stored at the memory 124, for example in URIs. For example a cherry picker of a primary public-safety responder type 130 may be quicker to reach the altitude 112 than a ladder of a secondary public-safety responder type 130.

Alternatively, the primary public-safety responder type 130 may correspond to a public-safety responder 128 that may have medical equipment suitable for responding to a particular incident type, and the secondary public-safety responder type 130 may correspond to a public-safety responder 128 that may have medical equipment that is less suitable for responding to a particular incident type. Such medical equipment may be determined by the PSAP device 102, for example on the basis of indications of respective vertical response rescue types, and in particular respective types of available medical equipment, stored at the memory 124, for example in URIs. Using an example of the call 108 being used to report a heart attack, a primary public-safety responder type 130 may have an automated external defibrillator (AED) and a secondary public-safety responder type 130 may have a manual defibrillator, which may be less effective at treating a heart attack than an AED.

Put another way, URIs stored at the memory 124 may also be used to determine equipment associated with public-safety responder types 130, and the PSAP device 102 may be configured with instructions and/or rules to compare equipment between public-safety responder types 130 to determine which public-safety responder types 130 are associated with "faster" or "better" equipment using programmatic rules and/or machine learning algorithms. It is understood that such determinations do not occur manually and are not mere automation of human activity as a human may not understand which equipment is "faster" or "better".

Once selection of the secondary public-safety responder type 130 has occurred, and the controller 218 and/or the PSAP device 102 has determined that the primary public-safety responder type 130 is unavailable, the controller 218 and/or the PSAP device 102 may repeat the block 306 or the block 308 of the method 300, however with respect to the secondary public-safety responder type 130.

Figure 4:
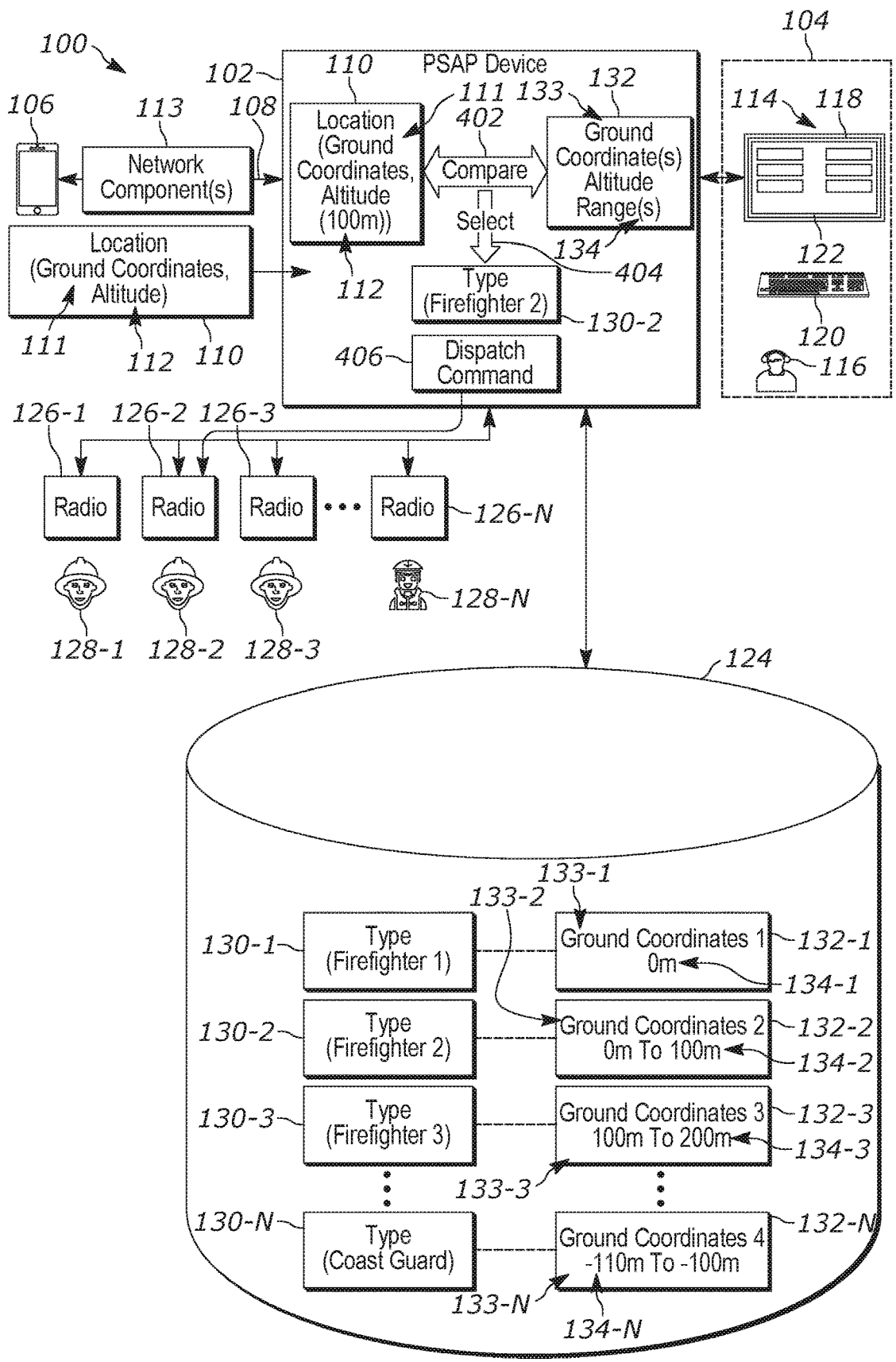
FIG. 4 depicts the system of FIG. 1 implementing aspects of method for dispatching public-safety responder types to a three-dimensional location, in accordance with some examples.
Figure 5:
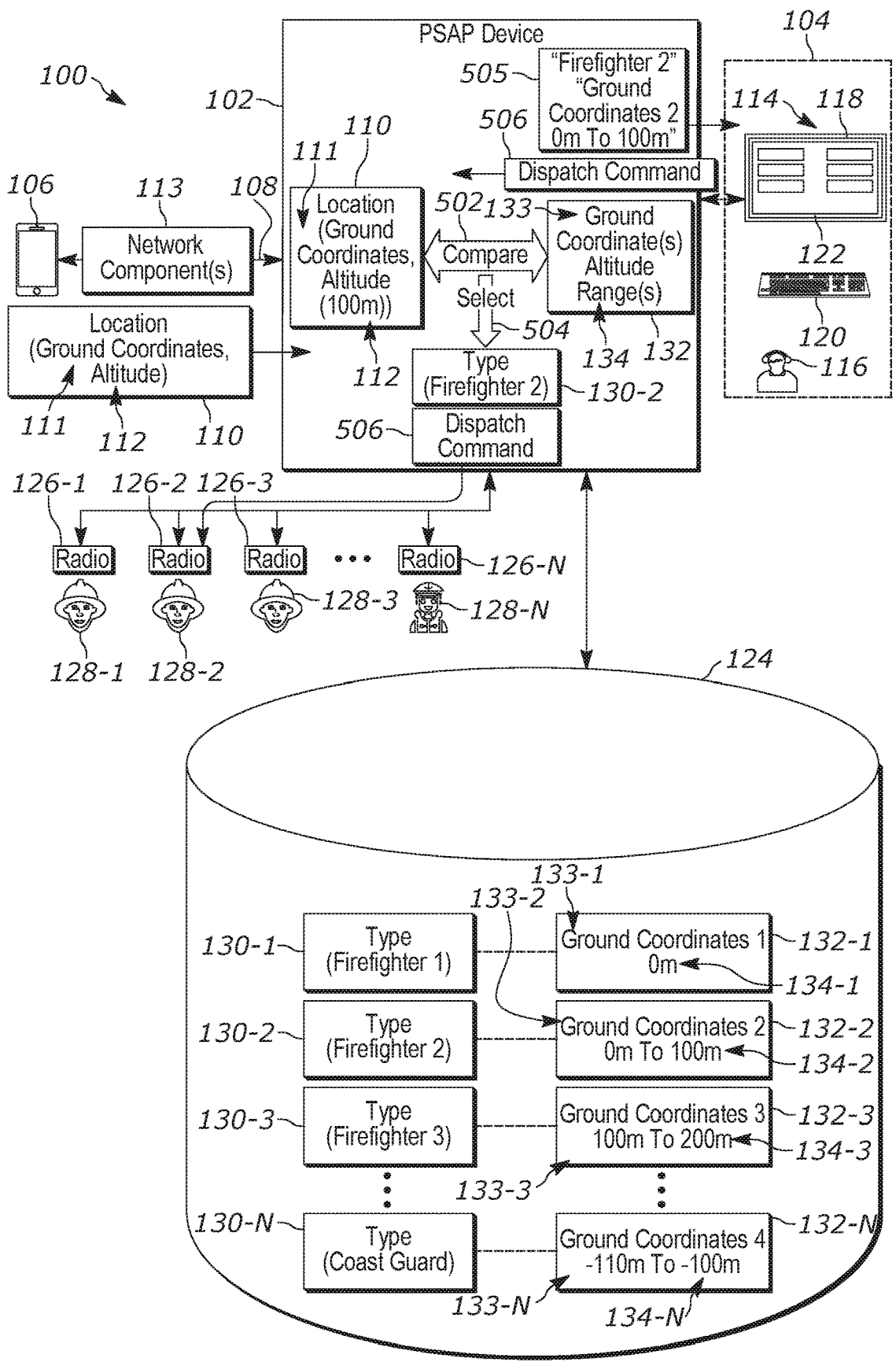
FIG. 5 depicts the system of FIG. 1 implementing further aspects of method for dispatching public-safety responder types to a three-dimensional location, in accordance with some examples.

Attention is next directed to FIG. 4 and FIG. 5, which depict examples of the method 300. FIG. 4 and FIG. 5 are substantially similar to FIG. 1 with like components having like numbers.

With attention directed to FIG. 4, the PSAP device 102 is understood to have received (e.g., at the block 302 of the method 300) the call 108 and the associated location 110 including the ground coordinates 111 and the altitude 112.

The PSAP device 102 compares (e.g., represented by a double-ended arrow 402) the associated location 110, including the ground coordinates 111 and the altitude 112, with the locations 132 associated with the public-safety responder types 130 (e.g., as retrieved from the memory 124), for example to select (e.g., at the block 304 of the method 300, as represented by an arrow 404) a primary public-safety responder type 130 associated with a corresponding altitude range 134 that includes the altitude 112 of the associated location 110 associated with the call 108 (e.g., the primary public-safety responder type 130 further associated with a corresponding ground coordinate range 133 that includes the ground coordinates 111 of the associated location 110 associated with the call 108).

In the depicted example, the altitude 112 comprises 100 meters, and the primary public-safety responder type 130 selected at the block 304 comprises the public-safety responder type 130-2, which has a corresponding altitude range 134-2 of meters to 100 meters, which includes the altitude 112 of 100 meters. It is assumed in FIG. 4 that the public-safety responder type 130-2, has a corresponding ground coordinate range 133-2 that includes the ground coordinates 111 associated with the call 108.

While the public-safety responder type 130-3 also has a corresponding altitude range 134-3 of 100 meters to 200 meters, which includes the altitude 112 of 100 meters, the public-safety responder type 130-2 may be selected as the primary public-safety responder type 130-2 due to other criteria, as described herein, such as an associated location of the public-safety responder type 130-2 being closer the ground coordinates 111 associated with the call 108 than a respective associated location of the public-safety responder type 130-3. In some of these examples, the public-safety responder type 130-3 may be designated as a secondary public-safety responder type 130 in the event the primary public-safety responder type 130-2 is unavailable for dispatch.

As depicted, the PSAP device 102 dispatches (e.g., at the block 306 of the method 300) the primary public-safety responder type 130-2 to the ground coordinates 111 and the altitude 112 associated with the call 108 via a dispatch command 406 that is provided to the radio 126-2 (e.g., via the communication interface 202). Hence, the primary public-safety responder 128-2 is quickly dispatched to the altitude 112, and without human intervention. The primary public-safety responder 128-2 may then respond to the call 108 at the ground coordinates 111 and the altitude 112.

Attention is next directed to FIG. 5, which depicts other aspects of the method 300. At FIG. 5, the PSAP device 102 is understood to have received (e.g., at the block 302 of the method 300) the call 108 and the associated location 110 including the ground coordinates 111 and the altitude 112.

The PSAP device 102 compares (e.g., represented by a double-ended arrow 502) the associated location 110, including the ground coordinates 111 and the altitude 112, with the locations 132 associated with the public-safety responder types 130, for example to select (e.g., at the block 304 of the method 300, as represented by an arrow 504) a primary public-safety responder type 130 associated with a corresponding altitude range 134 that includes the altitude 112 of the associated location 110 associated with the call 108 (e.g., the primary public-safety responder type 130 further associated with a corresponding ground coordinate range 133 that includes the ground coordinates 111 of the associated location 110 associated with the call 108).

In the depicted example, the altitude 112 comprises 100 meters, and the primary public-safety responder type 130 selected at the block 304 comprises the public-safety responder type 130-2, which has a corresponding altitude range 134-2 of 0 meters to 100 meters, which includes the altitude 112 of 100 meters. It is assumed in FIG. 5 that the public-safety responder type 130-2, has a corresponding ground coordinate range 133-2 that includes the ground coordinates 111 associated with the call 108.

While the public-safety responder type 130-3 also has a corresponding altitude range 134-3 of 100 meters to 200 meters, which includes the altitude 112 of 100 meters, the public-safety responder type 130-2 may be selected as the primary public-safety responder type 130-2 due to other criteria, as described herein, such as an associated location of the public-safety responder type 130-2 being closer the ground coordinates 111 associated with the call 108 than a respective associated location of the public-safety responder type 130-3. In some of these examples, the public-safety responder type 130-3 may be designated as a secondary public-safety responder type 130 in the event the primary public-safety responder type 130-2 is unavailable for dispatch.

However, in contrast to FIG. 4, in FIG. 5, the PSAP device 102 provides (e.g., at the block 308 of the method 300) to the PSAP 104, and in particular the PSAP terminal 114, an electronic suggestion 505 to dispatch the primary public-safety responder type 130-2 to the ground coordinates 111 and the altitude 112 associated with the call 108. While as depicted the electronic suggestion 505 includes an indication of the primary public-safety responder type 130-2, the corresponding ground coordinate range 133-2 and the corresponding altitude range 134-2, the electronic suggestion 505 may include any suitable information including, but not limited to the ground coordinates 111 and altitude 112 associated with the call 108, and/or any indications of the public-safety responder type 130-3, amongst other possibilities.

While not depicted in FIG. 5, the electronic suggestion 505 may be rendered at the display screen 118, for example at the interface 122, and the dispatcher 116 may interact with the PSAP terminal 114 via the input device 120 to provide a dispatch command 506 to the PSAP terminal 102, which provides the dispatch command 506 to the radio 126-2. The primary public-safety responder 128-2 may then respond to the call 108 at the ground coordinates 111 and the altitude 112. Alternatively, the PSAP terminal 114 may provide the dispatch command 506 to the radio 126-2 without using the PSAP device 102.

Figure 6:
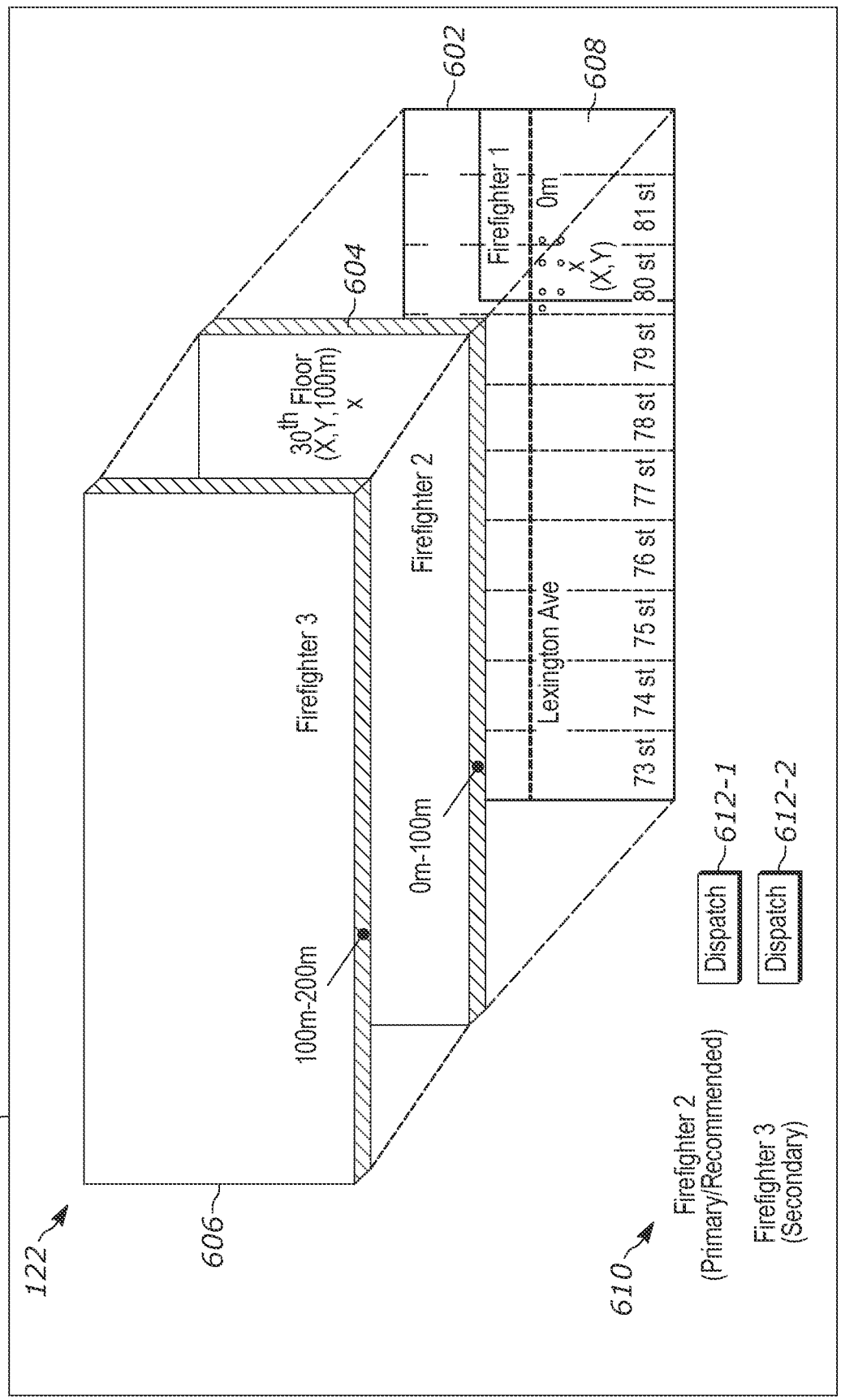
FIG. 6 depicts an example of an example of an interface rendered at a display screen to dispatch public-safety responder types to a three-dimensional location.

Attention is next directed to FIG. 6, which depicts an example of the interface 122 of FIG. 5 rendered at the display screen 118. In particular, the interface 122 an indication of the associated location 110 associated with the call 108, including the altitude 112. For example, as depicted, the interface 122 includes a map 602 of a region that includes the associated location 110, and an indication of the ground coordinates 111 associated with the call 108 at the map 602, for example shown as two-dimensional coordinates (X,Y) at the map 602 (e.g., with an "x" adjacent (X, Y) marking the location of the ground coordinates 111 and the altitude). However, an indication of the ground coordinates 111 and the altitude 112 associated with the call 108 are also depicted above the map 602, for example shown as three-dimensional coordinates (X, Y, 100 m) (e.g., with an "x" adjacent (X, Y, 100 m) marking the location of the ground coordinates 111 and the altitude 112). The indication of the ground coordinates 111 and the altitude 112 further includes a floor of a building associated with the location 110 (e.g., "30$^{th}$ Floor").

The interface 122 further includes an indication of at least a subset of the plurality of public-safety responder types 130 associated with a corresponding altitude range 134 that includes the altitude 112 and a corresponding ground coordinate range 133 that includes the ground coordinates 111. For example, the interface 122 textually lists "Firefighter 2" and "Firefighter 3", as described above with respect to FIG. 4 and FIG. 5.

The interface 122 further includes indications of the corresponding altitude ranges of the subset of the plurality of public-safety responder types 130 that are at or near the ground coordinates 111. For example, as depicted, a GIS layer 604 showing the three-dimensional range of locations 132-2 of the primary public-safety responder type 130-2 (e.g., "Firefighter 2"), relative to the map 602, and similarly a GIS layer 606 showing the three-dimensional range of locations 132-3 of the secondary public-safety responder type 130-3 ("Firefighter 3") is depicted, relative to the map 602. The GIS layers 604, 606 are also shown relative to the three-dimensional coordinates (X, Y, 100 m) and illustrate that either public-safety responder type 130-2, 130-3 could provide emergency services at the altitude 112.

As depicted, for completeness, the interface 122 further includes a GIS layer 608 showing the two-dimensional range of locations 132-1 (along with the associated altitude range 134-1 of "0 m") of the public-safety responder type 130-1 (e.g., "Firefighter 1") is depicted, relative to the map 602, merely to illustrate that the public-safety responder type 130-1 may not be capable of providing services at the altitude 112, even though a corresponding ground coordinate range 133 of the public-safety responder type 130-1 includes the ground coordinates 111 (e.g., "X, Y"). However, in other examples the GIS layer 608 is omitted.

As depicted, the interface 122 further includes a textual list 610 of the primary public-safety responder type 130-2 and the secondary public-safety responder type 130-3, with an indication that the primary public-safety responder type 130-2 has been suggested via the electronic suggestion 505 (e.g., via the text "Primary/Recommended"). The secondary public-safety responder type 130-3 is further indicated to be a secondary public-safety responder type (e.g., via the text "Secondary").

As depicted, the textual list 610 includes electronic buttons 612-1, 612-2 adjacent respective public-safety responder types of the textual list 610, and which may be respectively actuated (e.g., via the input device 120) to initiate the dispatch command 506 to dispatch a respective public-safety responder type 130. For example, the electronic button 612-1 may be actuated to dispatch the suggested/recommended primary public-safety responder type 130-2, and the electronic button 612-2 may be actuated to dispatch the secondary public-safety responder type 130-3, for example when the primary public-safety responder type 130-2 is unavailable for dispatch. When the primary public-safety responder type 130-2 is unavailable for dispatch the interface 122 may include, and/or may be updated, to provide an indication of such unavailability (e.g., text "Unavailable" may be rendered at the GIS layer 604 and/or adjacent the primary public-safety responder type 130-2 at the textual list 610).

Figure 7:
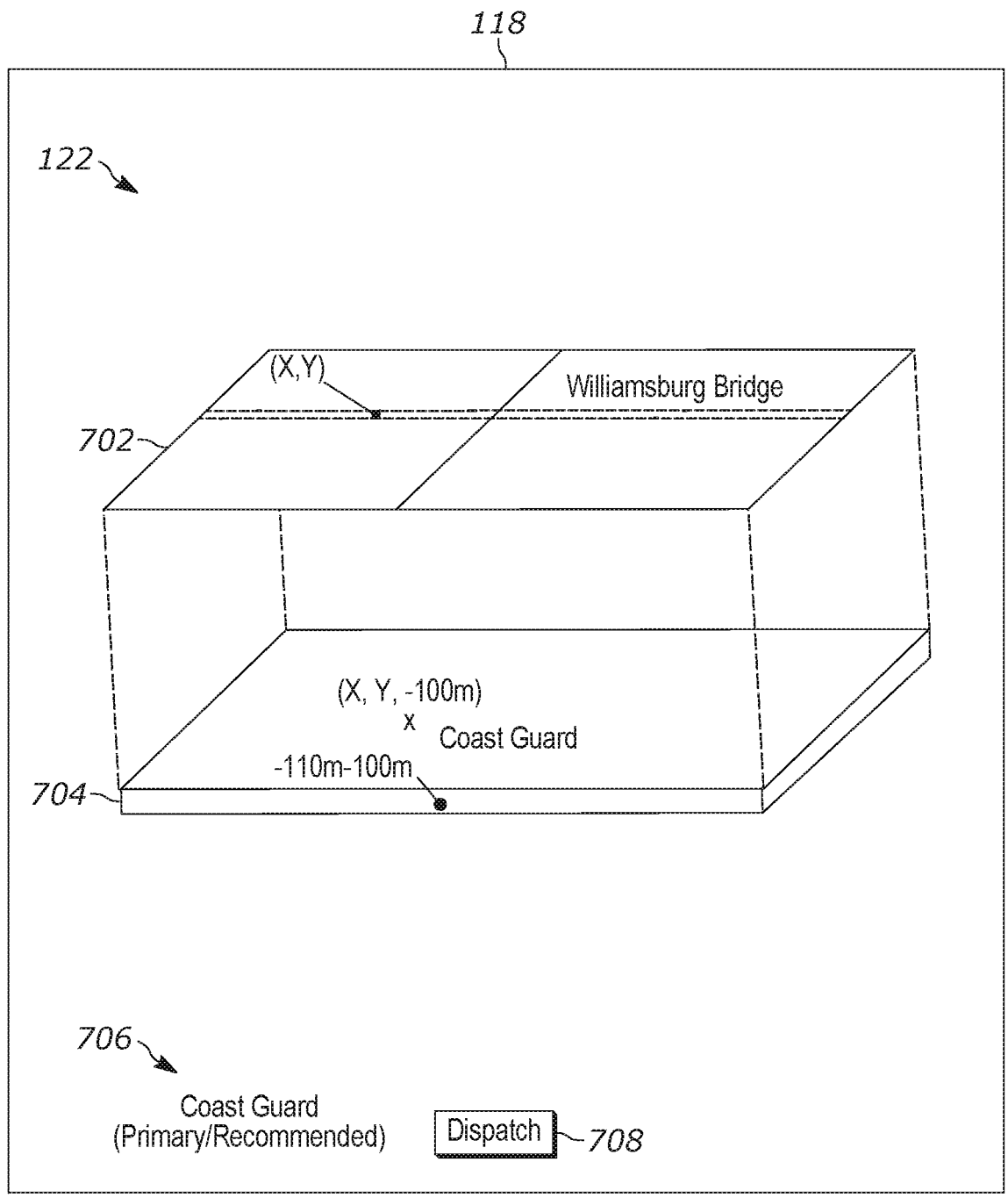
FIG. 7 depicts another example of an interface rendered at a display screen used to dispatch public-safety responder types to a three-dimensional location.

Attention is next directed to FIG. 7, which depicts another example of the interface 122 rendered at the display screen 118, where the altitude 112 associated with the call 108 is −100 meters. For example, as depicted, the three-dimensional location 110 associated with the call 108 may include at ground coordinates 111 located a bridge, shown as "X, Y" on a map 702, but at an altitude 112 of −100 m, so that the three-dimensional location 110 is under the bridge at water level, shown as "X, Y, −100 m" at FIG. 7.

As such, the public-safety responder type 130-N may be selected as the public-safety responder type 130-N (e.g., "Coast Guard") as the corresponding range of altitudes 134-N of −110 m to −100 m includes the altitude −100 (and presuming that the corresponding ground coordinate range 133-N includes the ground coordinates 111).

The interface 122 depicted in FIG. 7 further includes a GIS layer 704 showing the three-dimensional range of locations 132-N of the primary public-safety responder type 130-N (e.g., "Coast Guard") relative to the three-dimensional location 110 of "X, Y, −100 m" at FIG. 7.

Similar to FIG. 6, the interface 122 of FIG. 7 further includes a textual list 706 that includes the primary public-safety responder type 130-N, with an indication that the primary public-safety responder type 130-N has been suggested via the electronic suggestion 505 (e.g., via the text "Primary/Recommended"). No secondary public-safety responder type 130 is shown at the textual list, as no other public-safety responder type 130 has a corresponding altitude range 134 that includes the altitude 112.

Also similar to FIG. 6, the textual list 706 includes an electronic buttons 708 the primary public-safety responder type 130-N, which may be actuated (e.g., via the input device 120) to initiate the dispatch command 506 to dispatch primary public-safety responder type 130-N.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a communication interface;
   a controller configured to:
      receive, via the communication interface, a call and an associated location including ground coordinates and an altitude;
      select a primary public-safety responder type from a plurality of public-safety responder types associated with corresponding altitude ranges that are at or near the ground coordinates, the primary public-safety responder type associated with a corresponding altitude range that includes the altitude of the associated location of the call, wherein the plurality of public-safety responder types correspond to a plurality of different responders, each associated with a different corresponding altitude range; and
      one of:
         automatically dispatch, via the communication interface, the primary public-safety responder type to the ground coordinates and the altitude associated with the call; and
         provide, via the communication interface, to a public-safety answering point associated with the ground coordinates, an electronic suggestion to dispatch the primary public-safety responder type to the ground coordinates and the altitude associated with the call.

2. The device of claim 1, wherein the altitude and the corresponding altitude ranges are above a reference ground level or below the reference ground level.

3. The device of claim 1, wherein the controller is further configured to:
   render, at a display screen, an indication of:
      the associated location, including the altitude; and
      at least a subset of the plurality of public-safety responder types; and
   receive, via an input device, based on the indication as rendered, a selection of the primary public-safety responder type from the subset of the plurality of public-safety responder types.

4. The device of claim 3, wherein the indication includes one or more of:
   Geographic Information System (GIS) layers associated with the corresponding altitude ranges of the plurality of public-safety responder types, and a graphical indication of the associated location relative to the GIS layers; and
   textual indications of the associated location and the corresponding altitude ranges.

5. The device of claim 1, wherein the controller is further configured to automatically select the primary public-safety responder type from the plurality of public-safety responder types.

6. The device of claim 1, wherein the controller is further configured to access a memory to retrieve at least the corresponding altitude ranges that are at or near the ground coordinates.

7. The device of claim 1, wherein the corresponding altitude ranges include Geographic Information System (GIS) layers associated with the plurality of public-safety responder types.

8. The device of claim 1, wherein the plurality of public-safety responder types are further associated with one or more of:
respective contact information that enables respective dispatching of the plurality of public-safety responder types; and
respective vertical response rescue types.

9. The device of claim 1, wherein the controller is further configured to:
select a secondary public-safety responder type from the plurality of public-safety responder types, the secondary public-safety responder type associated with a respective corresponding altitude range that includes the altitude of the associated location of the call; and,
when the primary public-safety responder type is unavailable for dispatch, one of:
automatically dispatch, via the communication interface, the secondary public-safety responder type to the ground coordinates and the altitude associated with the call; and
provide, via the communication interface, to the public-safety answering point associated with the ground coordinates, a respective electronic suggestion to dispatch the secondary public-safety responder type to the ground coordinates and the altitude associated with the call.

10. The device of claim 1, wherein the controller is further configured to:
render, at a display screen, an indication of the corresponding altitude ranges of the subset of the plurality of public-safety responder types that are at or near the ground coordinates; and
receive, via an input device, based on the indication as rendered, a selection of the primary public-safety responder type from the subset of the plurality of public-safety responder types.

11. The device of claim 10, wherein the indication includes a floor of a building at the ground coordinates, the floor associated with the altitude.

12. A method comprising:
receiving, at a device, a call and an associated location including ground coordinates and an altitude;
selecting, via the device, a primary public-safety responder type from a plurality of public-safety responder types associated with corresponding altitude ranges that are at or near the ground coordinates, the primary public-safety responder type associated with a corresponding altitude range that includes the altitude of the associated location of the call, wherein the plurality of public-safety responder types correspond to a plurality of different responders, each associated with a different corresponding altitude range; and
one of:
automatically dispatching, via the device, the primary public-safety responder type to the ground coordinates and the altitude associated with the call; and
providing, via the device, to a public-safety answering point associated with the ground coordinates, an electronic suggestion to dispatch the primary public-safety responder type to the ground coordinates and the altitude associated with the call.

13. The method of claim 12, wherein the altitude and the corresponding altitude ranges are above a reference ground level or below the reference ground level.

14. The method of claim 12, further comprising:
rendering, at a display screen, an indication of:
the associated location, including the altitude;
at least a subset of the plurality of public-safety responder types; and
the corresponding altitude ranges of the subset of the plurality of public-safety responder types that are at or near the ground coordinates; and
receiving, via an input device, based on the indication as rendered, a selection of the primary public-safety responder type from the subset of the plurality of public-safety responder types.

15. The method of claim 14, wherein the indication includes one or more of:
Geographic Information System (GIS) layers associated with the corresponding altitude ranges of the plurality of public-safety responder types, and a graphical indication of the associated location relative to the GIS layers;
textual indications of the associated location and the corresponding altitude ranges; and
a floor of a building at the ground coordinates, the floor associated with the altitude.

16. The method of claim 12, further comprising automatically selecting the primary public-safety responder type from the plurality of public-safety responder types.

17. The method of claim 12, further comprising accessing a memory to retrieve at least the corresponding altitude ranges that are at or near the ground coordinates.

18. The method of claim 12, wherein the corresponding altitude ranges include Geographic Information System (GIS) layers associated with the plurality of public-safety responder types.

19. The method of claim 12, wherein the plurality of public-safety responder types are further associated with one or more of:
respective contact information that enables respective dispatching of the plurality of public-safety responder types; and
respective vertical response rescue types.

20. The method of claim 12, further comprising:
selecting a secondary public-safety responder type from the plurality of public-safety responder types, the secondary public-safety responder type associated with a respective corresponding altitude range that includes the altitude of the associated location of the call; and,
when the primary public-safety responder type is unavailable for dispatch, one of:
automatically dispatching the secondary public-safety responder type to the ground coordinates and the altitude associated with the call; and
providing, to the public-safety answering point associated with the ground coordinates, a respective electronic suggestion to dispatch the secondary public-safety responder type to the ground coordinates and the altitude associated with the call.

* * * * *